UNITED STATES PATENT OFFICE.

CARLETON ELLIS, OF MONTCLAIR, NEW JERSEY.

HYDROGENATED BUTTER SUBSTITUTE.

1,038,545.  Specification of Letters Patent.  Patented Sept. 17, 1912.

No Drawing.   Application filed May 31, 1912.  Serial No. 700,841.

*To all whom it may concern:*

Be it known that I, CARLETON ELLIS, a citizen of the United States, and a resident of Montclair, in the county of Essex and State of New Jersey, have invented certain new and useful Improvements in Hydrogenated Butter Substitutes, of which the following is a specification.

This invention relates to a vegetable butter composition and the process of making same, and relates in particular to the use of hydrogenated vegetable oil, for the production of vegetable butter composition, all as more fully hereinafter described and as claimed.

The common vegetable oils, such as cotton seed oil, corn oil, peanut oil, soy bean oil and the like are too fluid to be used for making butter-like compositions, and also possess odors which are objectionable. The flavor imparted to the butter-like composition by the use of these oils in any quantity, also militates against their use in any large proportion. Sometimes it is possible to use 10 or 15% or so of highly refined vegetable oil in butter-like compositions, but unless the oil is thoroughly deodorized no large proportion ordinarily should be used. By the treatment of these oils with hydrogen in the presence of a catalytic body such as finely divided nickel, or copper, cobalt and the like, or oxids, such as nickel oxid, iron oxid, etc., it is possible to greatly increase the consistency of the oil, so as to produce a firm, solid composition. At the same time the odoriferous components of the oil are apparently destroyed, so that a firm product of pleasant odor is secured. In order, however, to produce a material which is suitably deodorized, it is generally desirable to carry the hydrogenation treatment to a point where a product of rather firm consistency is secured. This produces a material, however, which is of too high a melting point for the production of a vegetable butter composition. These compositions should ordinarily have a melting point considerably less than the temperature of the human body, so that when the material is taken into the mouth, it immediately melts and does not leave a greasy sensation on the tongue and walls of the mouth. In the present invention, therefore, I preferably over hydrogenate the oil for this purpose in order to effect satisfactory deodorization and thus produce a material containing too high a proportion of the vegetable stearin. In order to modify the melting point, the product thus obtained is cooled and the stearin allowed to separate or crystallize from the more oily components. The product is then pressed to remove the excessive amount of stearin, and is then ready to be incorporated with milk or similar material, in order to produce a vegetable butter composition of a character suitable for commercial purposes. If desired, however, the oil may be treated with steam, that is to say it may be blown with steam, using a slight vacuum if desired, and also may be filtered through fullers' earth all according to the nature of the oil to be treated; it being preferable to treat with steam or to filter through fullers' earth after hydrogenation in order to remove any gases which may be left in the oil as a result of the hydrogenation process. The degree of hydrogenation, therefore, depends upon the nature of the oil employed. For example, in the case of cotton seed oil, it is desirable to hydrogenate until the iodin number falls to about 80 or thereabout. The oil may then be cooled to about 30° C. or so, and allowed to stand for a time and then pressed to remove the excess of stearin. It is then melted or warmed to render it entirely fluid, and is incorporated with the milk material. Suitable material of this character is ordinary full milk or skim milk or butter-milk, sterilized milk, sour milk or milk which has been specially fermented using lactic acid ferment and the like. For example, ferment such as *Bacillus butyricus* or *bulgaricus* and the like may be used. In a similar manner Kafir grains or ferment may be employed using a sterilized milk and allowing the ferment to act upon the milk until a suitable transformation in its qualities has been secured. Sour milk is especially desirable because of the excellent butter taste which it gives to product. Condensed milk having perhaps 50% of its water removed is sometimes desirable because of the readiness with which it blends with oily material. Salt, to the extent of 2 to 8% or thereabout, may be added according to the degree of saltiness desired.

Suitable coloring material such as ordinary butter color may likewise be added. Also a flavoring compound such as cumarin and propionic, butyric and capronic acid, as well as various esters and aldehydes such as those of valerian and capryl bodies may be added.

In order to give the product the property of browning, when heated in a skillet, bodies such as egg yolk, milk sugar, lecithin and finely powdered casein and the like may be introduced.

Of the oils mentioned cotton seed and peanut oil are especially suitable, while corn and soy bean oil also are adapted for use in this way. Various other oils may also be incorporated if desired, such as lard and tallow oil, almond oil, olive oil, rape seed oil, cocoanut oil and the like may be added in various proportions, although in general it should be stated that the product preferably should consist of vegetable oil. If oils other than those set forth as preferable in the present invention, are employed, it is desirable also to hydrogenate these to improve their odor. Cocoanut oil is not generally speaking desirable, because of the fact that it has a tendency to become rancid in the presence of moisture.

A suitable oil base having been derived in this manner, the oily material is incorporated with the milk material by a process of emulsification or in any other suitable way to thoroughly blend the milk material with the fatty body. For 100 parts of fatty material about 30 to 60 parts of full milk or perhaps 50 to 80 parts of skim milk are suitable proportions. In the summer months a stiffer composition is required than in the winter months and the fatty material should be compounded to give a material melting at the proper point with reference to seasonal temperatures. In emulsifying it is desirable to put a portion of the milk in the beating apparatus, and to stir for a short time. In the case of full milk, beating for 10 minutes or so, causes a separation of the butter fat. The oil may then be added in portions, beating thoroughly until the composition is well blended. The remainder of milk and fatty material may be added from time to time, and the temperature of the mixture, preferably should be maintained between 30 and 40° C. When the composition has become thoroughly blended, it is run from the blending apparatus into a cooling device which cools the emulsified composition rapidly. It is then ready to be rolled and kneaded to remove the excess of water, etc. The material is then ready to be formed into the desired shape for shipment. The coloring material and salt and also flavoring material may be added during the emulsification process if desired. Ordinary butter or renovated butter may be introduced in moderate amount to improve the flavor if this is deemed desirable.

Where the term oil or fat is used herein, it should be understood to refer to material of an oleaginous nature, and that the term fat or oil is used indiscriminately in both specification and claims to comprise or embrace suitable fatty material.

Reference is made herein to my co-pending application Serial No. 715,209, filed August 15, 1912, as regards certain divisional matter which is not claimed herein.

What I claim is:—

1. The process of making a butter-like composition which comprises incorporating edible hydrogenated oil with milk material.

2. The process of making a butter-like composition which comprises incorporating edible hydrogenated fatty oil with milk material.

3. The process of making a butter-like composition which comprises incorporating edible hydrogenated fatty oil with milk material and in expressing the excess of moisture.

4. The process of making a butter-like composition which comprises incorporating edible hydrogenated vegetable oil with milk material and in expressing the excess of moisture.

5. The process of making a butter-like composition which comprises incorporating by emulsification edible hydrogenated vegetable oil with milk material and in expressing the excess of moisture.

6. The process of making a butter-like composition which comprises hydrogenating an edible vegetable oil, pressing to remove the excess of stearin and incorporating the more fluid components with milk material, and in expressing the excess of moisture.

7. A butter-like composition comprising edible hydrogenated fatty oil.

8. A butter-like composition comprising edible hydrogenated vegetable oil.

9. A butter-like composition comprising edible hydrogenated fatty oil and moisture.

10. A butter-like composition comprising edible hydrogenated vegetable oil and moisture.

11. A butter-like composition comprising edible hydrogenated vegetable oil and milk material.

12. A butter-like composition comprising edible hydrogenated vegetable oil and sour milk material.

13. A butter-like composition comprising edible hydrogenated vegetable oil, milk material and flavoring material.

14. A butter-like composition comprising edible hydrogenated oil freed from excessive amounts of stearin, milk material and flavoring material.

15. A butter-like composition comprising edible hydrogenated vegetable oil, milk material, flavoring material, and salt.

16. A butter-like composition comprising edible hydrogenated vegetable oil, milk material, flavoring material, salt and coloring material.

17. A butter-like composition comprising edible hydrogenated vegetable oil, sour milk material, flavoring material, salt, and coloring matter.

18. A butter-like composition comprising edible hydrogenated fatty oil freed from excess of stearin produced by hydrogenation, milk material and flavoring material.

19. A butter-like composition comprising edible hydrogenated vegetable oil, sour milk material, flavoring material, salt, and coloring matter; said composition being adjusted as to melting point whereby it becomes fluid at a temperature less than that of the human body.

20. A butter-like composition comprising edible hydrogenated vegetable oil and milk material of reduced moisture content.

21. A butter-like composition comprising edible hydrogenated oil and milk material, said composition containing elements producing browning when heated.

22. A butter-like composition comprising edible hydrogenated vegetable oil and milk material containing *Bacillus bulgaricus*.

23. A butter-like composition comprising edible hydrogenated oil and milk material containing ferment.

24. A butter-like composition comprising edible hydrogenated oil of reduced stearin content.

25. A butter-like composition comprising edible hydrogenated cotton seed oil and milk material.

26. A butter-like composition comprising edible hydrogenated cotton seed oil in a state of emulsion.

Signed at Montclair in the county of Essex and State of New Jersey this 29th day of May, A. D. 1912.

CARLETON ELLIS.

Witnesses:
BIRDELLA M. ELLIS,
ANITA B. FERRIS.